US009696037B2

(12) United States Patent
Kidder et al.

(10) Patent No.: US 9,696,037 B2
(45) Date of Patent: Jul. 4, 2017

(54) LINER RETAINING FEATURE FOR A COMBUSTOR

(71) Applicant: General Electric Company, Schenectady, NY (US)

(72) Inventors: Kyle Lee Kidder, Greenville, SC (US); Charles Lewis Davis, III, Simpsonville, SC (US); Steven Bataille, Greenville, SC (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 14/515,661

(22) Filed: Oct. 16, 2014

(65) Prior Publication Data

US 2016/0109135 A1 Apr. 21, 2016

(51) Int. Cl.

| | |
|---|---|
| ***F23R 3/60*** | (2006.01) |
| ***F23R 3/00*** | (2006.01) |
| ***F23R 3/44*** | (2006.01) |
| ***F23R 3/58*** | (2006.01) |
| ***F23R 3/42*** | (2006.01) |
| ***F23R 3/52*** | (2006.01) |
| ***F23R 3/50*** | (2006.01) |
| ***F23R 3/54*** | (2006.01) |
| ***F23R 3/46*** | (2006.01) |
| *F02C 7/20* | (2006.01) |

(52) U.S. Cl.

CPC ................ *F23R 3/60* (2013.01); *F23R 3/002* (2013.01); *F23R 3/007* (2013.01); *F23R 3/42* (2013.01); *F23R 3/44* (2013.01); *F23R 3/46* (2013.01); *F23R 3/50* (2013.01); *F23R 3/52* (2013.01); *F23R 3/54* (2013.01); *F23R 3/58* (2013.01); *F02C 7/20* (2013.01); *F05D 2260/30* (2013.01); *F05D 2260/31* (2013.01); *F23R 2900/00017* (2013.01)

(58) Field of Classification Search

CPC .. F23R 3/002; F23R 3/007; F23R 3/42; F23R 3/44; F23R 3/46; F23R 3/50; F23R 3/52; F23R 3/54; F23R 3/58; F23R 3/60; F23R 2900/00017; F05D 2260/30; F05D 2260/31; F02C 7/20

See application file for complete search history.

(56) References Cited

U.S. PATENT DOCUMENTS 3,500,639 A * 3/1970 Stamm ...................... F23R 3/48 60/39.37
5,323,600 A * 6/1994 Munshi ..................... F23R 3/60 60/772
6,216,442 B1 * 4/2001 Belsom ..................... F02C 7/20 60/752
2007/0240423 A1 10/2007 Bulman et al.
2009/0019855 A1 * 1/2009 Venkataraman .......... F23R 3/06 60/738

(Continued)

*Primary Examiner* — Gerald L Sung
*Assistant Examiner* — Scott Walthour
(74) *Attorney, Agent, or Firm* — Eversheds Sutherland (US) LLP

(57) ABSTRACT

The present application provides a combustor for use with a gas turbine engine. The combustor may include a liner and a flow sleeve surrounding the liner with the liner and the flow sleeve defining a flow path therebetween. A liner retaining feature extends into the flow path to retain the liner within the flow sleeve. The liner retaining feature may include a bolt therein.

20 Claims, 3 Drawing Sheets

(56) References Cited

U.S. PATENT DOCUMENTS

| | | | | |
|---|---|---|---|---|
| 2009/0101788 | A1 | 4/2009 | Kidder et al. | |
| 2009/0321608 | A1 | 12/2009 | Melton et al. | |
| 2010/0242485 | A1 | 9/2010 | Davis, Jr. et al. | |
| 2012/0198851 | A1 | 8/2012 | David, Jr. et al. | |
| 2013/0213047 | A1* | 8/2013 | Desai | F23R 3/002<br>60/752 |
| 2013/0327854 | A1 | 12/2013 | Davis, III et al. | |
| 2014/0123658 | A1 | 5/2014 | Kidder et al. | |
| 2014/0157783 | A1 | 6/2014 | Kidder et al. | |

* cited by examiner

LINER RETAINING FEATURE FOR A COMBUSTOR

TECHNICAL FIELD

The present application and the resultant patent relate generally to gas turbine engines and more particularly relate to an improved retaining feature for securing a liner within a flow sleeve of a combustor with simplified manufacture and overall design.

BACKGROUND OF THE INVENTION

The operational efficiency and the overall power output of a gas turbine engine generally increases as the temperature of the hot combustion gas stream increases. High combustion gas stream temperatures, however, may produce higher levels of nitrogen oxides (NOx) and other types of regulated emissions. Such emissions may be subject to both federal and state regulations in the United States and also may be subject to similar regulations abroad. A balancing act thus exists between the benefits of operating the gas turbine engine in an efficient high temperature range while also ensuring that the output of nitrogen oxides and other types of regulated emissions remain well below mandated levels. Moreover, varying load levels, varying ambient conditions, and many other types of operational parameters also may have a significant impact on overall gas turbine efficiency and emissions.

Lower emission levels of nitrogen oxides and the like may be promoted by providing for good mixing of the fuel stream and the air stream prior to combustion. Several types of known gas turbine engine designs such as those used in Dry Low NOx ("DLN") combustors generally premix the fuel stream and the air stream upstream of a reaction or a combustion zone so as to reduce NOx emissions via a number of premixing fuel nozzles. Such premixing tends to reduce overall combustion temperatures and, hence, NOx emissions and the like.

The interface between internal components of a DLN combustor, however, may vary from typical baseline designs. For example, if the baseline design is used in a DLN combustor, the anti-withdraw tabs from a combustor cap may expand significantly in an axial direction and stick out of the cap into the open space. These tabs thus may be prone to damage during handling and assembly. Other design distinctions also may be present.

There is thus a desire for an improved DLN combustor and the like. Such an DLN combustor may provide an improved liner retaining feature for simplified manufacturing and design while maintaining overall efficient operations with low emissions.

SUMMARY OF THE INVENTION

The present application and the resultant patent thus provide a combustor for use with a gas turbine engine. The combustor may include a liner and a flow sleeve surrounding the liner with the liner and the flow sleeve defining a flow path therebetween. A liner retaining feature extends into the flow path to retain the liner within the flow sleeve. The liner retaining feature may include a bolt therein with a lock tab.

The present application and the resultant patent further provide a method of retaining a liner within a flow sleeve. The method may include the steps of positioning a liner lug of the liner within a flow sleeve boss of a flow sleeve, positioning a bolt into a bolt aperture of the flow sleeve boss to retain the liner within the flow sleeve, and locking the bolt into place.

The present application and the resultant patent further provide for a combustor for use with a gas turbine engine. The combustor may include a liner with a liner lug, a flow sleeve with a flow sleeve boss surrounding the liner, and a bolt retaining the liner lug to the flow sleeve boss.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
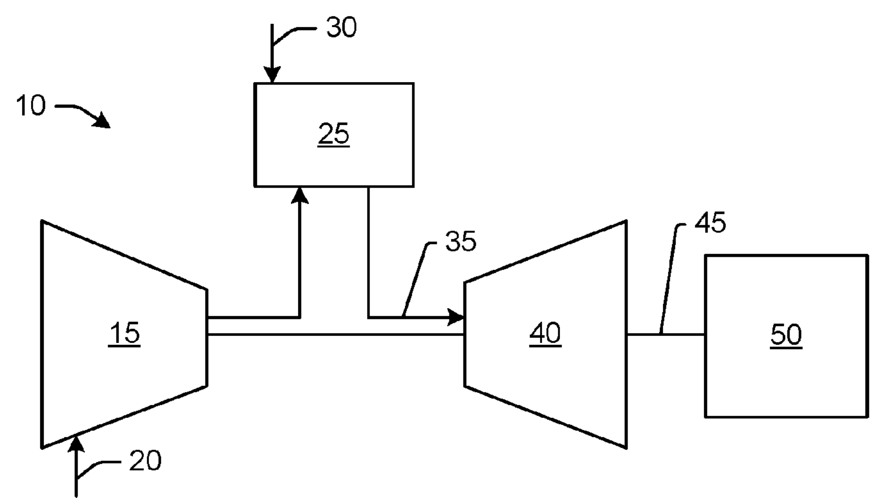
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
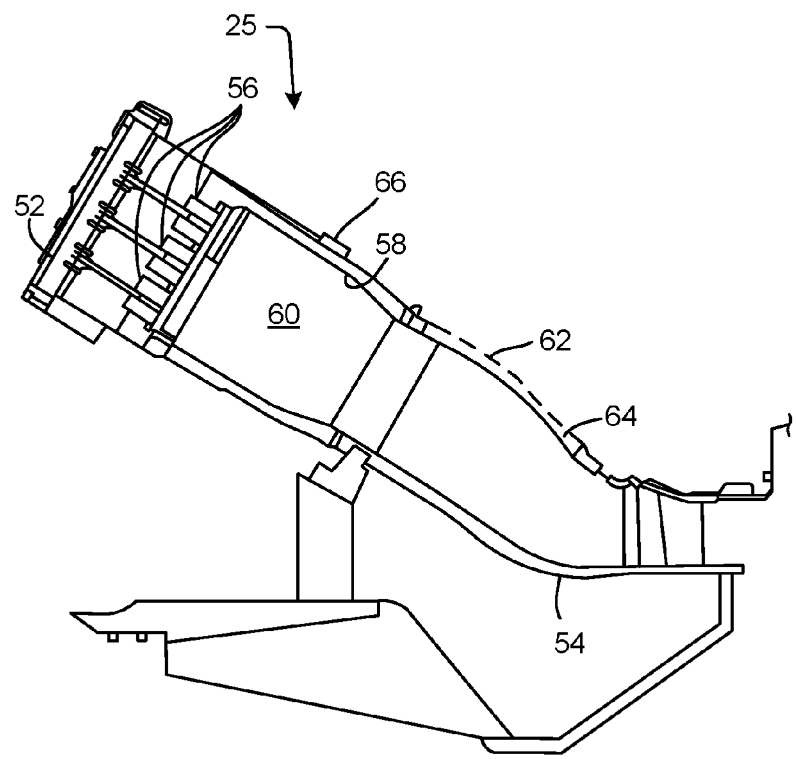
FIG. 2 is a schematic diagram of a combustor that may be used with the gas turbine engine of FIG. 1.
Figure 3:
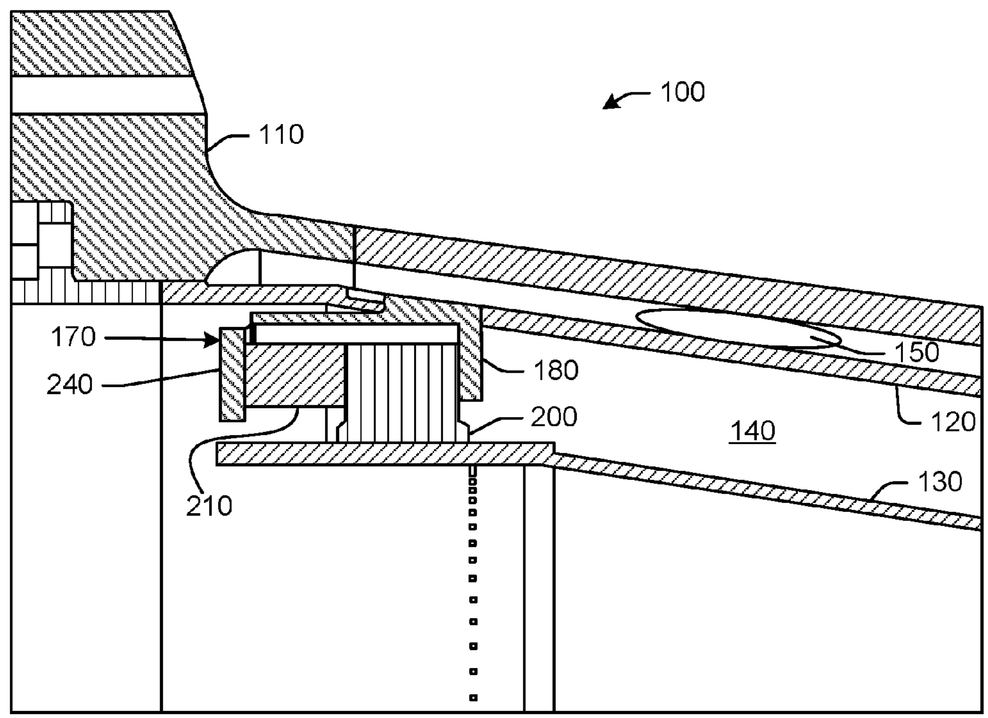
FIG. 3 is a perspective view of a liner retaining feature and the components thereof as may be described herein.
Figure 4:
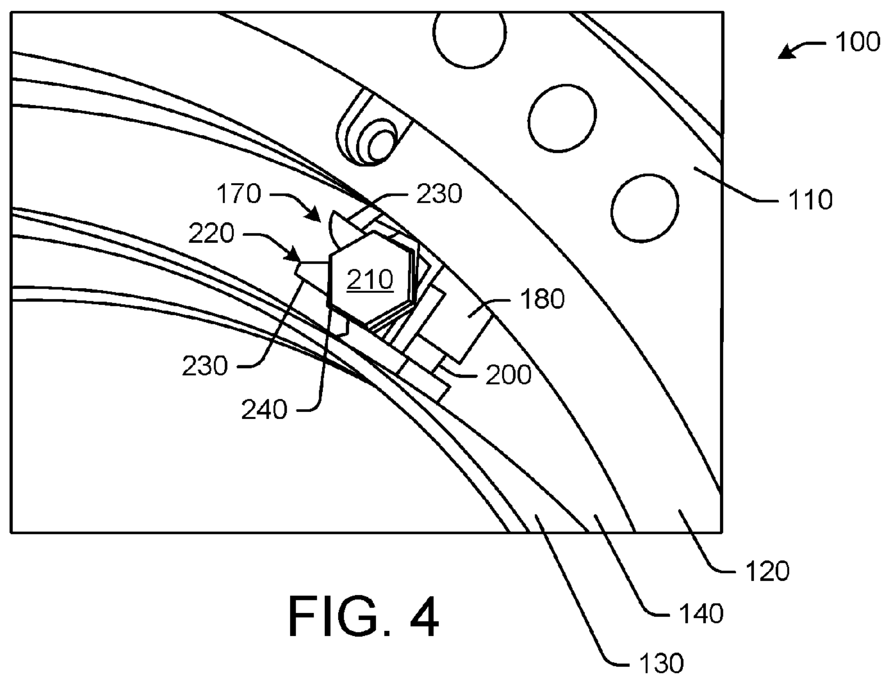
FIG. 4 is a side sectional view of the liner retaining feature of FIG. 3.
Figure 5:
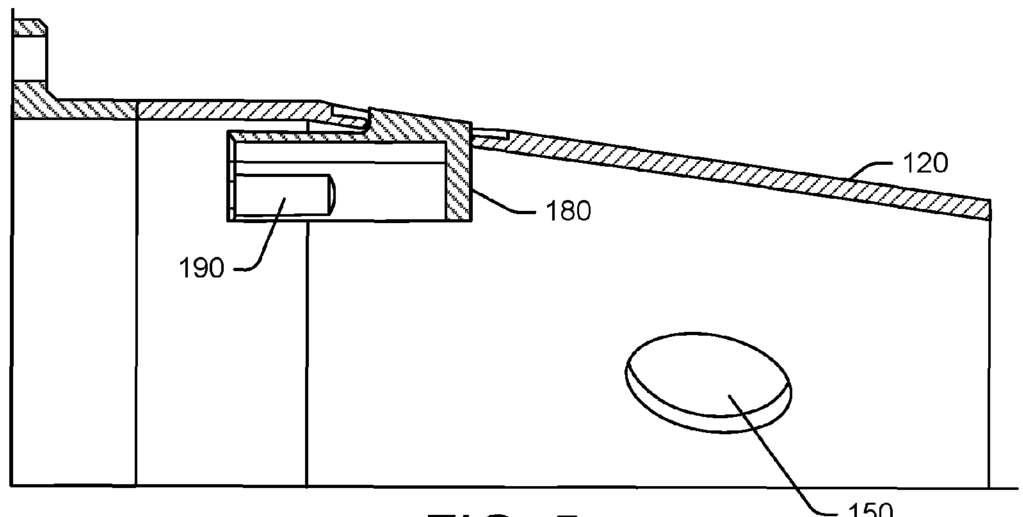
FIG. 5 is a partial side sectional view of the liner retaining feature of FIG. 3.
Figure 6:
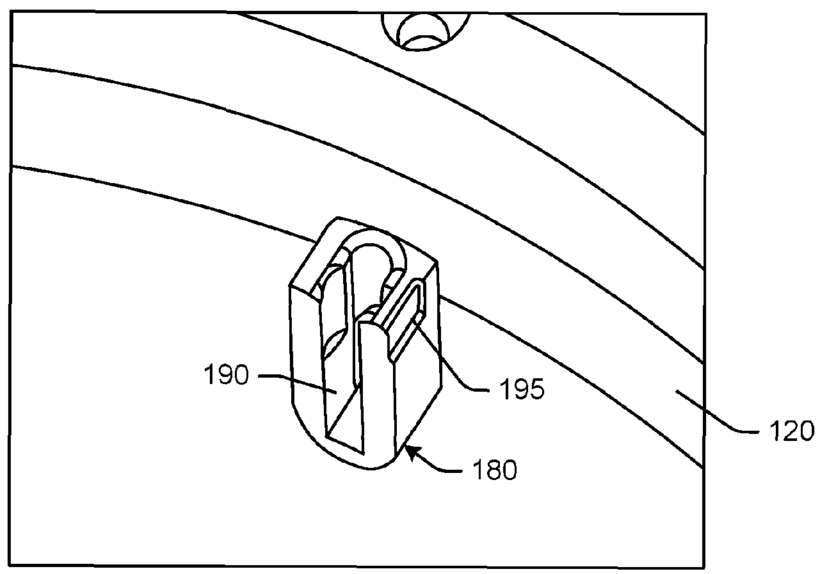
FIG. 6 is a partial perspective view of the liner retaining feature of FIG. 3.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. An outer casing 66 may surround the flow sleeve 62 in part. Any number of the combustors 25 may be used herein in a circumferential array and the like. As described above, the flow of air 20 and the flow of fuel 30 may be ignited in the combustor 25 to create the flow of combustion gases 35. The combustor 25 described herein is for the purpose of example only. Combustors with other types of components and other configurations also may be used herein.

FIGS. 3-6 show an example of a portion of a combustor 100 as may be described herein. Generally described, the combustor 100 may include an outer casing 110 with an internal flow sleeve 120. Likewise, a liner 130 may be positioned within the flow sleeve 120 and define the combustion zone 60 therein. The flow sleeve 120 and the liner 130 may define a flow path 140 therebetween for the flow of air 20 from the compressor 15 or otherwise. The flow sleeve 120 and the liner 130 may have a number of apertures 150 therethrough. The apertures may accommodate different types of auxiliary components such as sparkplugs, flame detectors, dynamic detectors, cross-fire tubes, and other types of devices. The casing 110, the flow sleeve 120 and the liner 130 may have any suitable size, shape, or configuration.

FIGS. 3-6 also show an example of a liner retaining feature 170 as may be described herein. One or more of the liner retaining features 170 may secure the liner 130 within the flow sleeve 120. Any number of the liner retaining features 170 may be used herein.

The liner retaining feature 170 may include a flow sleeve boss 180 attached to the flow sleeve 120. The flow sleeve boss 180 may be attached via conventional means. The flow sleeve boss 180 may extend from the flow sleeve 120 radially inward into the flow path 140 towards the liner 130. The flow sleeve boss 180 may have one or more bolt apertures 190 formed therein. The flow sleeve boss 180 also may have one or more lock tab apertures 195 formed therein. The flow sleeve boss 180 may have any suitable size, shape, or configuration.

The liner retaining feature 170 also may include a liner lug 200 attached to the liner 130. The liner lug 200 may be attached via conventional means. The liner lug 200 may extend from the liner 130 radially outward into the flow path 140 towards the flow sleeve 120 and into the flow sleeve boss 180. The liner lug 200 may be sized to mate with the flow sleeve boss 180 within the bolt aperture 190. The liner lug 200 may have any suitable size, shape, or configuration.

The liner retaining feature 170 may include a bolt 210. The bolt 210 may be sized to be inserted within the bolt aperture 190 of the flow sleeve boss 180 of the flow sleeve 120. The bolt 210 may have any suitable size, shape, or configuration. Other types of connecting linkages may be used herein. The retaining feature 170 also may include a lock tab 220. The lock tab 220 may secure the bolt 210 to the liner lug 200 once inserted within the flow sleeve boss 180. The lock tab 220 may have a number of flanges 230 that extend about a head 240 of the bolt 210 or otherwise and positioned about the lock tab apertures 195. The lock tab 220 may have any suitable size, shape, or configuration.

During assembly, the liner lug 200 of the liner 130 may be positioned about the flow sleeve boss 180 of the flow sleeve 120 within the bolt aperture 190. Once the liner 130 is seated therein, the bolt 210 may be positioned within the bolt aperture 190 of the flow sleeve boss 180 to fix the liner lug 200 therein. The lock tab 220 then secures the bolt 210 against further movement. Use of the liner retaining feature 170 thus simplifies the overall manufacturing process. The liner retaining feature 170 also reduces the stack-up for the distance the liner 130 may travel within the combustor 100 during operation so as to reduce the risk for wear interfaces about the apertures 150 or elsewhere. The liner retaining feature 170 also prevents the liner 130 from backing out during operation. The liner retaining feature 170 may be original equipment or part of a retrofit with existing designs.

The liner retaining feature 170 thus provides a single, simplified liner stop combining the DLN flow sleeve and cap liner stops. Moreover, the flow sleeve boss and bolt provide the required liner assembly clearance with a reduced stack-up loop and overall wear couples.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A combustor for use with a gas turbine engine, comprising:

a liner comprising a liner lug;

a flow sleeve surrounding the liner and comprising a flow sleeve boss, the flow sleeve boss comprising a channel extending from an upstream end of the flow sleeve boss, with respect to combustion flow through the combustor, to a downstream face of the flow sleeve boss, with respect to combustion flow through the combustor; and a bolt securing the liner lug to the flow sleeve boss;

wherein the liner lug and the bolt are positioned within the channel; and wherein the bolt comprises a longitudinal axis extending in an axial direction of the combustor along a flow path defined between the liner and the flow sleeve.

2. The combustor of claim 1, further comprising a casing surrounding the flow sleeve in whole or in part.

3. The combustor of claim 1, wherein the liner and the flow sleeve each comprise one or more apertures defined therethrough.

4. The combustor of claim 1, wherein the bolt comprises an upstream end and a downstream end, and wherein the bolt secures the liner lug between the downstream end of the bolt and the downstream face of the flow sleeve boss.

5. The combustor of claim 1, further comprising a lock tab positioned about the bolt to secure the bolt relative to the liner lug, wherein the lock tab comprises a plurality of flanges surrounding a head of the bolt.

6. The combustor of claim 1, wherein the flow sleeve boss extends radially inward into the flow path toward the liner, and wherein the liner lug extends radially outward into the flow path toward the flow sleeve.

7. A combustor for use with a gas turbine engine, comprising:

a liner;

a flow sleeve surrounding the liner;

the liner and the flow sleeve defining a flow path therebetween; and a liner retaining feature extending into the flow path to retain the liner within the flow sleeve, the liner retaining feature comprising:

a flow sleeve boss attached to the flow sleeve and comprising a channel defined therein, the channel extending from an upstream end of the flow sleeve boss, with respect to combustion flow through the combustor, to a downstream face of the flow sleeve boss, with respect to combustion flow through the combustor;

a liner lug attached to the liner and positioned within the channel; and a bolt positioned within the channel to secure the liner lug therein, the bolt comprising a longitudinal axis extending in an axial direction of the combustor.

8. The combustor of claim 7, further comprising a casing surrounding the flow sleeve in whole or in part.

9. The combustor of claim 7, further comprising a plurality of liner retaining features extending into the flow path to retain the liner within the flow sleeve.

10. The combustor of claim 7, wherein the flow path is configured to direct a flow of air from a compressor.

11. The combustor of claim 7, wherein the liner and the flow sleeve each comprise one or more apertures defined therethrough.

12. The combustor of claim 7, wherein the flow sleeve boss comprises a downstream wall defining the downstream face and defining a downstream end of the flow sleeve boss.

13. The combustor of claim 7, wherein the bolt comprises an upstream end and a downstream end, and wherein the bolt secures the liner lug between the downstream end of the bolt and the downstream face of the flow sleeve boss.

14. The combustor of claim 7, wherein the flow sleeve boss extends from the flow sleeve radially inward into the flow path toward the liner.

15. The combustor of claim 7, wherein the liner lug comprises an upstream end and a downstream end, wherein the bolt engages the upstream end of the liner lug, and wherein the flow sleeve boss engages the downstream end of the liner lug.

16. The combustor of claim 7, wherein the liner lug extends from the liner radially outward into the flow path toward the flow sleeve.

17. The combustor of claim 7, wherein the liner retaining feature further comprises a lock tab positioned about the bolt to secure the bolt relative to the liner lug.

18. The combustor of claim 17, wherein the lock tab comprises a plurality of flanges surrounding a head of the bolt.

19. The combustor of claim 7, wherein the combustor is a dry low nitrogen oxide combustor.

20. The combustor of claim 7, wherein the liner surrounds a combustion zone of the combustor.

* * * * *